Oct. 31, 1967  W. H. McMULLEN ETAL  3,350,167
METHOD OF PREPARING HYDRATED NICKEL CARBONATE
AND THE PRODUCT THEREOF
Filed Sept. 26, 1963
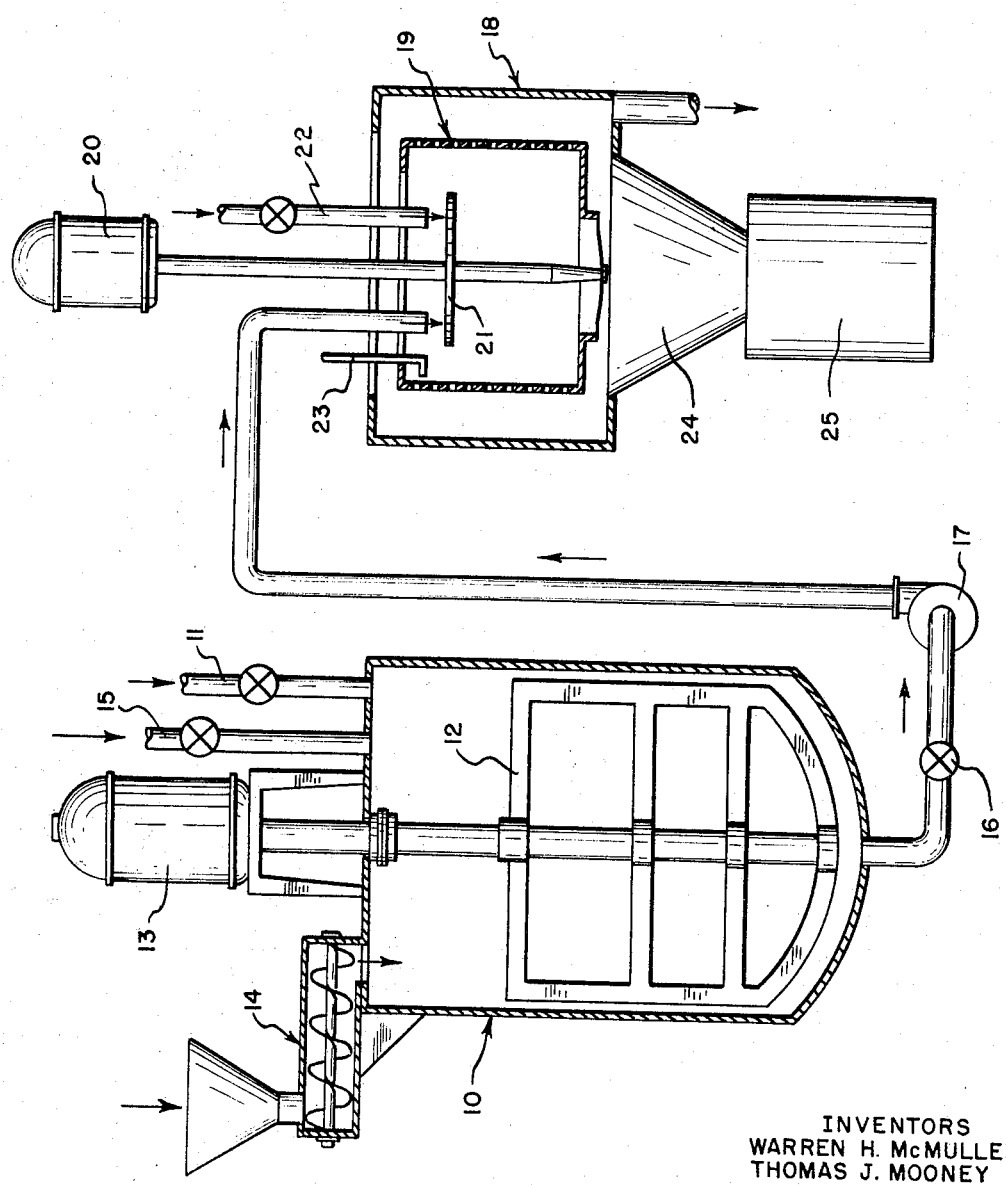
INVENTORS
WARREN H. McMULLEN
THOMAS J. MOONEY
WILLIAM B. STODDARD, JR.
BY
ATTORNEYS 3,350,167
METHOD OF PREPARING HYDRATED NICKEL CARBONATE AND THE PRODUCT THEREOF
Warren H. McMullen, East Brunswick, Thomas J. Mooney, Fords, and William B. Stoddard, Jr., Matawan, N.J., assignors to Hanson-Van Winkle-Munning Company
Filed Sept. 26, 1963, Ser. No. 311,681
11 Claims. (Cl. 23—61)

This invention relates to nickel carbonates and is particularly directed to a nickel carbonate composition of fine crystalline particles of hydrates of nickel carbonate having low impurity and the process for producing the same.

Anhydrous nickel carbonate ($NiCO_3$) and its hydrates containing three water molecules ($NiCO_3 \cdot 3H_2O$) and six water molecules ($NiCO_3 \cdot 6H_2O$) have been recorded in the literature. According to the methods described therein, the anhydrous form of nickel carbonate can be produced by reacting an aqueous nickel salt with an alkali carbonate in a sealed tube at 140° C. to 150° C. or by reacting an aqueous nickel salt with an alkali hydrogen carbonate in a boiling acidic solution. The nickel carbonate so produced is in the form of a colloidal or flocculent precipitate which retains traces of salts and other impurities with great tenacity. Recovering this precipitate by conventional filtering and washing techniques cannot be effectively performed and the resultant nickel carbonate recovered contains a high concentration of impurities and hence, it is of low commercial value. Similarly, trihydrate and hexahydrate of nickel carbonate are reported to be the products of nickel salts and alkali hydrogen carbonate under different reaction conditions. The resultant precipitates are equally difficult to handle and pure hydrates rarely are obtained in a commercial scale.

The commercially available nickel carbonates are usually in a basic form containing $NiCO_3$ and $Ni(OH)_2$ at various proportions, i.e., $2NiCO_3 \cdot 3Ni(OH)_2 \cdot H_2O$ or $NiCO_3 \cdot 2Ni(OH) \cdot H_2O$. The dried compositions are characterized by their basic properties and the relatively coarse particle size which contribute to their low chemical reactivities. When they are ground, these compositions are in the form of amorphous powder of various appearances and compositions, which agglomerates or cakes readily. It is, therefore, apparent that grinding will not effectively increase the chemical reactivity of these commercially available nickel carbonates.

The present invention provides a nickel carbonate composition of substantially unfractured fine crystalline particles of hydrates of nickel carbonate having about 38% to about 43% of nickel and conforming to at least one of the formulas $NiCO_3 \cdot 2H_2O$ and $NiCO_3 \cdot H_2O$. It is particularly intended to provide a composition which is extremely low in impurity and has a major portion of the particles smaller than 325 mesh. This fine particle size distribution and its inherent lack of basic characteristics greatly increases its chemical reactivity which was, heretofore, not obtainable from the nickel carbonate of commerce.

Broadly stated, the nickel carbonate composition of this invention is produced by reacting a water soluble nickel salt, hereafter referred to as an aqueous nickel salt, with an alkali hydrogen carbonate in an agitated aqueous medium at a temperature ranging from about 27° C. to about 49° C. The resultant nickel carbonate, which has fast filtering and washing characteristics, then is recovered from the aqueous medium.

We have found that in this optimum temperature range of about 27° C. to about 49° C. the nickel carbonate precipitate can be easily and readily separated from the solution in which it is suspended. This fast filtering nickel carbonate may be efficiently washed to remove the impurities attached thereto, and, therefore, a nickel carbonate composition with an extremely low concentration of impurities can be obtained. It is noted when the temperature is below the critical range the resultant nickel carbonate precipitate has entirely different characteristics. Noticeably, the color of the nickel carbonate precipitate changes from a normally green color to a blue coloration and the sandy nickel carbonate precipitate is replaced by a creamy colloidal suspension. Recovering the nickel carbonate from the colloidal suspension becomes an extremely difficult task in which conventional filtering cannot be effectively used. Similarly, at a temperature above 49 C°. the resultant nickel carbonate pecipitate is equally difficult to handle. The filtered cake sometimes assumes thixotropic properties which dries into a hard mass requiring additional grinding to produce a powdered product.

Maintaining the reaction in this temperature range, however, is complicated by the inherent nature of the chemical reaction. The reaction between the aqueous nickel salt and the alkali hydrogen carbonate is an endothermic chemical reaction which will lower the temperature of the reaction medium. Since it is not desirable to use the solution at a temperture above 49° C., for reasons that will be discussed later, this reaction is sufficient at times to lower the temperature to below 27° C. which causes the formation of the undesirable precipitate. Although it is possible to maintain the temperature within the critical range during the reaction by controlling the reaction variables such as the concentration of the reactants, their addition rates and external heat source, a simpler method is more desirable for the economic production of nickel carbonate on a commercial scale, which still will insure the complete formation of a desirable product. We find it is possible to transform the undesirable colloidal precipitate that forms outside of the critical temperature range to the product of the invention by maintaining the suspension at a temperature range between about 27° C. to about 49° C., after the initial reaction has been completed. At this temperature, we find the blue creamy suspension will gradually transform to the fast filtering type of nickel carbonate. To insure the complete transformation at least 10 minutes should be allowed. In general, 15 to 25 minutes appears to be quite adequate.

To illustrate the invention more clearly, a presently preferred embodiment of this invention is particularly described below with reference to the accompanying drawing. In this embodiment nickel chloride and sodium hydrogen carbonate are used to produce the nickel carbonate composition of this invention. The complete reaction of these two compounds can be illustrated by the chemical equation

$$NiCl_2 + 2NaHCO_3 \rightarrow NiCO_3\downarrow + 2NaCl + H_2O + CO_2\uparrow$$

It is important that at least a stoichiometric amount of sodium hydrogen carbonate be used in the reaction to eliminate the formation of hydrogen chloride. We have found the presence of hydrogen chloride in the solution hinders the recovery of the desirable product.

In this process about 35 gallons of water are first preheated to a temperature between about 44° C. and 49° C. At this temperature, the reaction will take place at an adequately fast rate and the precipitation can take place within the critical temperature range. It is not desirable to use temperatures above this range, for the sodium bicarbonate will decompose with the possible formation of a normal sodium bicarbonate $Na_2CO_3$. In the presence of $Na_2CO_3$, some basic nickel carbonates will be formed which proportionally alter the chemical composition and the physical characteristics of the nickel carbonate precipitate. The resultant nickel carbonate can no longer be separated and washed easily and the dried nickel carbonate filter cake is hard and requires grinding to produce a powder.

This pre-heated water is introduced into a reactor 10 through tube 11. An agitator 12 driven by a variable speed drive 13 is provided in the reactor. 148 pounds of sodium hydrogen carbonate are slowly fed into the reactor 10 through the screw feeder 14 with the agitator 12 running continuously to provide a uniform slurry. When the addition of the sodium hydrogen carbonate to the water is completed, 35 gallons of nickel chloride solution that has a nickel concentration of 177 gm./liter are added slowly to the slurry through the tube 15. Nickel chloride reacts with sodium hydrogen carbonate vigorously with the evolution of a large volume of carbon dioxide or carbonic acid gas. This violent chemical reaction can be controlled by adjusting the addition rate of the nickel chloride solution. When the nickel chloride solution is completely added to the reactor, the resultant mixture is diluted with water to a total volume of about 100 gallons to facilitate the handling of the nickel carbonate suspension. To insure the completion of the reaction, a small sample of nickel carbonate slurry is removed from the reactor and filtered. The degree of the completion can be judged by the color of the filtrate from the slurry sample. For an incomplete reaction, a green colored filtrate is obtained which requires additional sodium hydrogen carbonate.

We have found that a trace amount of $Ba^{++}$ or $Ca^{++}$ ions in the reacting system improves the physical character of the nickel carbonate crystals. When such ions are present, the nickel carbonate crystals can be filtered and washed more readily. These ions can be introduced into the reaction conveniently by adding about one gram per liter of $Ba^{++}$ or $Ca^{++}$ in the form of their soluble salts in the nickel chloride solution. It is important to note that the resultant nickel carbonate from the $Ba^{++}$ or $Ca^{++}$ seeded slurry can be used to seed other lots of nickel carbonate even though soluble $Ba^{++}$ and $Ca^{++}$ compounds are absent. Generally, when the reactor is used only for the production of nickel carbonate, the residue on the walls and bottom of the tank is sufficient for this seeding purpose.

If the reaction is carried out within the critical temperature range, the precipitated nickel carbonate is now in the proper form. The slurry containing this precipitate is then transferred to the centrifuge 18 by opening valve 16 and with the aid of the pump 17. It is important that the agitator be continuously operated throughout the reaction and during the transfer to avoid the settling of the precipitate which is difficult to resuspend once it is settled. The slurry feeding to the centrifuge 18 is evenly distributed on the inner surface of the basket 19 with the assistance of a rotating disc 21 located at the center of the centrifuge. The basket rotating at 400 to 500 r.p.m. by motor 20 rapidly collects a layer of nickel carbonate.

When this cake has reached a thickness of about 3½" to about 4" on the basket wall, the feeding of slurry to the centrifuge is stopped. Water from tube 22 is used to wash the cake to remove soluble products, such as chloride. The length of the washing period is determined partly by the amount and nature of soluble impurities in the cake, but mostly by its draining properties.

On the other hand, if the reaction temperature has fallen below the critical range, which may be caused by the cold weather, fast reaction or other factors, it is important that the creamy blue suspension be reheated to a temperature between about 27° C. and about 49° C. At this temperature, the precipitate is suspended for at least 10 minutes, preferably 15 to 20 minutes, to allow the complete transformation of the product. It is only after these steps that the slurry can be transferred to the centrifuge for separation.

The washing cycle is followed by additional spinning of the centrifuge to remove excess water. Subsequent to the removal of water, the plow 23 is used to scrape the cake off the basket 19. The moist, loose nickel carbonate passes through funnel 24 into the container 25.

The resulting damp, washed nickel carbonate cake formed in a 40 inch centrifuge spun for 12 minutes at 1100 revolutions per minute will have a nickel content of about 27.5%. This moist product dries in warm air to a fine, soft powder which contains about 38% of nickel, corresponding to the formula $NiCO_3 \cdot 2H_2O$. Moderate heating of this dried nickel carbonate powder produces a color change from pale green to slightly yellow green. The nickel content of this moderately heated product is about 43% which indicates the formula to be $$NiCO_3 \cdot H_2O$$

The anhydrous nickel carbonate $NiCO_3$ that contains about 49.3% of nickel can be produced by heating the monohydrate at a higher temperature. When the heating is carried out properly, the dried nickel carbonate of this invention retains its fine, free-flowing characteristics during these transformations.

In the dry form, with or without water of crystallization, the nickel carbonate produced in accordance with the process of this invention consists of fine crystalline particles, a large portion of them being smaller than 325 mesh. Over 90% of these nickel carbonate crystals, which have not been fractured by mechanical means, such as by grinding, pass through 325 mesh. For comparison, Table I shows a screen analysis of a typical nickel carbonate of this invention as compared with the screen analysis of a typical commercially available nickel carbonate.

TABLE I

| Nickel Carbonate of this invention | | | Commercial Nickel Carbonate | | |
| --- | --- | --- | --- | --- | --- |
| Mesh | Percent | Cumulative percent | Mesh | Percent | Cumulative percent |
| On 60 | 0.1 | | On 60 | 48.5 | |
| On 80 | 0.0 | 0.1 | On 80 | 17.0 | 65.6 |
| On 100 | 0.1 | 0.2 | On 100 | 5.5 | 71.0 |
| On 150 | 0.8 | 0.1 | On 150 | 7.5 | 78.5 |
| On 200 | 1.2 | 2.3 | On 200 | 4.0 | 82.5 |
| On 325 | 2.8 | 5.1 | On 325 | 7.5 | 90.0 |
| Through 325 | 94.9 | 100.0 | Through 325 | 10.0 | 100.0 |

The size distribution of our nickel carbonate varies according to the conditions of the process. Generally it is within the ranges shown in Table II.

TABLE II

| Mesh size: | Weight, percent |
| --- | --- |
| 60 | Less than 0.3. |
| 80 | Less than 0.3. |
| 100 | Less than 0.3. |
| 150 | 1 to 3. |
| 200 | 1 to 3. |
| 325 | 1 to 3. |
| Through 325 | Balance. |

This nickel carbonate contains low concentrations of impurities. Typical analyses of the nickel carbonates of this invention are shown in Table III.

TABLE III

| Impurities: | Percent |
| --- | --- |
| Ni | 38.0–38.5 |
| Iron | 0.005–0.01 |
| Copper | 0.005–0.001 |
| Zinc | 0.0005–0.005 |
| Lead | 0.0005–0.001 |
| Sulfate | nil |
| Chloride | 0.01–0.02 |

The chemicals used to produce nickel carbonate of this invention are not limited to nickel chloride and sodium hydrogen carbonate. Other water soluble nickel salts such as nickel sulfate and nickel nitrate are equally applicable. Other alkali hydrogen carbonates such as potassium and lithium may also be used.

To illustrate the important effect of temperature on precipitation, filtration and washing rates, and on the character of the dry nickel carbonate, five specific examples are described below. The results are tabulated in Table IV. In all of these examples 138 g. of technical $NaHCO_3$ was slurried with 250 ml. of deionized water at a fixed temperature. 250 ml. of $NiCl_2$ solution at the same temperature containing 48.2 g. nickel were then added to the slurry. After the addition was completed, the mixture was agitated to the point of lowest temperature and its temperature noted. The precipitate was then filtered through a Büchner funnel and washed once with 250 ml. of water.

TABLE IV.—EFFECT OF TEMPERATURE ON FILTRATION AND WASHING RATES AND CHARACTER OF DRY NICKEL CARBONATE CAKE

| Temp. of Reactants, °C. | Temp. Minimum After Mixing, °C. | Color of the Cake | Time to Filter, Minutes A | Time for one Wash, Minutes B | A plus B, Minutes | Character of Wet Cakes | Character of Air Dry Cake |
|---|---|---|---|---|---|---|---|
| 10 | 3 | Blue | 32 | 25 | 57 | | Hard. |
| 26 | 11 | Blue-green | 9 | 5 | 14 | | Powdery. |
| 35 | 17 | Green | 2 | 2 | 4 | | Do. |
| 50 | 28 | ----do---- | 3 | 5 | 8 | Thixotropic | Hard. |
| 70 | 45 | ----do---- | 4 | 4 | 8 | | Do. |

The nickel carbonate of this invention has a variety of industrial applications. Its high chemical reactivity and low concentration of impurities make it especially attractive as an additive to nickel plating solutions for raising the pH without introducing foreign metallic ions to the solution. For example, in raising the pH of a 250 ml. Watts Nickel bath, starting at a pH of 3.5 at 60° C., with 5 grams of our nickel carbonate, the pH was 4.8 in 30 seconds. With a regular commercial grade of nickel carbonate, 300 seconds were required to obtain this same pH value. The rate of pH change with both carbonates tapers off rapidly with the nickel carbonate of this invention arriving at a pH of 4.92 in 180 seconds, while commercial nickel carbonate gave a value of 4.86 after 600 seconds. The two Watts nickel solutions used above were filtered under identical conditions. The solution to which our nickel carbonate had been added filtered in 1 minute, 10 seconds while 18 minutes were required for filtering the solution with the standard grade of basic nickel carbonate.

In addition to the superior qualities of our nickel carbonate composition as applied to nickel plating solutions, we have found that it shortens the time required for the manufacture of such nickel chemicals as nickel sulfamate and nickel fluoborate. Moreover, purer products are obtained because of the low impurity content in the nickel carbonate of this invention.

We claim:

1. A process for producing nickel carbonate in fine crystalline form having fast filtering and washing characteristics, which comprises reacting a water soluble nickel salt with an alkali hydrogen carbonate in an agitated aqueous medium at a temperature ranging from about 27° C. to about 49° C. and recovering said nickel carbonate from the aqueous medium.

2. Nickel carbonate produced in a process according to claim 1.

3. A process for producing nickel carbonate in fine crystalline form having fast filtering and washing characteristics, which comprises reacting a water soluble nickel salt with an alkali hydrogen carbonate in a continuous agitated aqueous medium at a temperature ranging from about 27° C. to about 49° C. and recovering said nickel carbonate from the aqueous medium by sequential steps of filtering and washing.

4. A process for producing nickel carbonate in fine crystalline form having fast filtering and washing characteristics which comprises reacting a water soluble nickel salt with an alkali hydrogen carbonate in a continuously agitated aqueous medium, maintaining the resultant nickel carbonate in suspension at a temperature ranging from about 27° C. to about 49° C. for at least 10 minutes, and recovering said nickel carbonate from the aqueous medium by sequential steps of filtering and washing.

5. A process for producing nickel carbonate in fine crystalline form having fast filtering and washing characteristics which comprises reacting a water soluble nickel salt with an alkali hydrogen carbonate in an aqueous medium, the alkali hydrogen carbonate in the reaction being at least the stoichiometric amount to produce the nickel carbonate and to eliminate the acid formed during the reaction, precipitating the resultant nickel carbonate from the aqueous medium by seeding said medium with a trace amount of a compound selected from a group consisting of water soluble salts of barium and calcium and nickel carbonate at a temperature ranging from about 27° C. to about 49° C., and recovering said nickel carbonate in air dried form from the aqueous medium by sequential steps of filtering, washing, and air drying.

6. A process for producing nickel carbonate in fine crystalline form having fast filtering and washing characteristics which comprises reacting nickel chloride with sodium hydrogen carbonate in an agitated aqueous medium, at a temperature ranging from about 27° C. to about 49° C. and recovering said nickel carbonate from the aqueous medium.

7. A process for producing nickel carbonate in fine crystalline form having fast filtering and washing characteristics, which comprises reacting nickel chloride with sodium hydrogen carbonate in an agitated aqueous medium, maintaining the resultant nickel carbonate in suspension at a temperature ranging from about 27° C. to about 49° C. for at least 10 minutes, and recovering said nickel carbonate from the aqueous medium by sequential steps of filtering and washing.

8. A process for producing nickel carbonate in fine crystalline form having fast filtering and washing characteristics which comprises reacting nickel chloride with sodium hydrogen carbonate in an agitated aqueous medium, the alkali hydrogen carbonate in the reaction being at least the stoichiometric amount to produce the nickel carbonate and to eliminate the acid formed during the reaction, precipitating the resultant nickel carbonate from the aqueous medium by seeding said medium with a trace amount of a compound selected from a group consisting of water soluble salts of barium and calcium, and nickel carbonate at a temperature ranging from about 27° C. to about 49° C. for about 15 to 25 minutes, and recovering the precipitated nickel carbonate crystals from the aqueous medium by sequential steps of filtering and washing.

9. A process for producing nickel carbonate in fine crystalline form having fast filtering and washing characteristics which comprises reacting nickel chloride with sodium hydrogen carbonate in a continuously agitated aqueous medium at a temperature ranging from about 27° C. to about 49° C., the alkali hydrogen carbonate in the reaction being at least the stoichiometric amount to produce the nickel carbonate and to eliminate the acid formed during the reaction, precipitating the resultant nickel carbonate from the aqueous medium by seeding said medium with a trace amount of a compound selected from a group consisting of water soluble salts of barium and calcium, and nickel carbonate, and recovering the precipitated nickel carbonate crystals in air dried form from the aqueous medium by sequential steps of filtering, washing, and air drying.

10. A process for producing nickel carbonate in fine crystalline form having fast filtering and washing characteristics which comprises reacting nickel chloride with sodium hydrogen carbonate in water having an initial temperature range of 44° to 49° C., precipitating the resultant nickel carbonate from the aqueous medium by seeding said medium with a trace amount of a compound selected from a group consisting of water soluble salts of barium and calcium and nickel carbonate, maintaining the resultant nickel carbonate in suspension at a temperature ranging from about 27° C. to about 49° C. for 15 to 20 minutes, recovering the precipitated nickel carbonate crystals from the aqueous medium by filtering, washing said filtered carbonates to remove impurities and drying said carbonates to remove excess water.

11. A process for producing nickel carbonate in fine crystalline form having fast filtering and washing characteristics which comprises reacting nickel chloride with sodium hydrogen carbonate in water having an initial temperature range of 44° to 49° C., said nickel chloride containing a trace amount of $Ba^{++}$, maintaining the resultant nickel carbonate in suspension at a temperature ranging from about 27° C. to about 49° C. for 15 to 20 minutes, recovering the precipitated nickel carbonate crystals from the aqueous medium by filtering, washing said filtered carbonates to remove impurities and drying said carbonates to remove excess water.

References Cited

UNITED STATES PATENTS 1,427,037   8/1922   Teichner _____ 252—443

FOREIGN PATENTS 893,168   4/1962   Great Britain.

OTHER REFERENCES

Mellor: Comprehensive Treatise on Inorganic and Theoretical Chemistry, vol. 15, Longmans, Green and Co., New York, 1936, p. 485.

OSCAR R. VERTIZ, *Primary Examiner.*

MILTON WEISSMAN, G. OZAKI, *Assistant Examiners.*